United States Patent Office 3,502,217
Patented Mar. 24, 1970

3,502,217
ABRASION-RESISTANT CHROMATOPLATES
Klaus Brückner, Darmstadt-Eberstadt, Herbert Halpaap, Jugenheim, and Hubert Rössler, Darmstadt, Germany, assignors to E. Merck AG., Darmstadt, Germany
No Drawing. Filed June 17, 1966, Ser. No. 558,288
Claims priority, application Germany, June 18, 1965, M 65,630
Int. Cl. B01d *15/08*
U.S. Cl. 210—198                    28 Claims

ABSTRACT OF THE DISCLOSURE

A chromatographic plate comprising a support plate having superimposed thereon an intimate mixture of, in percent by weight, 0.1 to 10 percent of a polymeric binder selected from a group consisting of a normally solid vinyl-type polymer containing carboxyl groups, and salts thereof, and 73 to 99.9% of a chromatography adsorbent selected from the group consisting of silica gel, kieselguhr, aluminum oxide, magnesium silicates, and calcium phosphate.

---

This invention relates to chromatography, and in particular to improved abrasion-resistant chromatoplates.

Plate chromatography has become of growing importance in both analytical and preparative chemistry. Using thicker layers, thin-layer chromatography which was originally developed only for analytical purposes is now also an important technique in preparative chemistry.

The adsorbents generally used in plate chromatography are silica gel, kieselguhr, aluminum oxide, magnesium silicates, and calcium phosphate. However, layers of these adsorbents spread on plates or films do not sufficiently adhere to them. Such layers are sensitive to mechanical influences, and dipping of the plates or films into the solvent or solvent mixture used for development frequently leads to detachment of that part of the layer situated in the liquid; thus the chromatogram remains incompletely developed. Therefore, several suggestions have been made relating to the use of binders or adhesives such as starch, gypsum, carboxymethyl cellulose or polyvinyl alcohol. Moreover, the addition of particulate silicon dioxide or aluminum oxide to the adsorbent is known to have a beneficial effect on its adherence.

All known inorganic adhesives are, however, inadequate for the production of abrasion-resistant adsorbent layers, unless the content in gypsum is so high that the concentration of the adsorbent is markedly reduced. Using gypsum in order to produce abrasion-resistant layers, also results in the serious disadvantages in that those substances forming slightly soluble calcium salts or sulphates are retarded at the starting point of the chromatogram. Therefore, adsorbents containing gypsum are of little use for chromatography of inorganic substances.

With respect to the commonly used organic adhesives such as starch, a noteworthy disadvantage incident to their employment is that the resultant layers used for development cannot be sprayed with all types of color-imparting agents. For example, after the spraying of the adsorbent layer with concentrated acids and subsequent heating, the layer exhibits a dark color and makes identification of organic substances more difficult or even impossible.

The abrasion resistance of adsorbent layers is very important as the glass plates or films are desired to be storable one upon the other without any damage to the adsorbent layers. In this way, storage, packing and transport of the adsorbent layers spread on glass plates or films would be greatly facilitated. For example, in filing chromatograms for purposes of documentation or identification, there is no problem if the layers are so abrasion-resistant that they can be neatly stacked without danger of disintegration.

A principal object of the invention, therefore, is to provide improved abrasion-resistant chromatoplates, and adsorbent compositions for their manufacture.

Upon further study of the specification and claims, other objects and advantages of the present invention will become apparent.

To achieve the objectives of this invention, there is added to an adsorbent base such as silica gel, silicious earth, aluminum oxide, magnesium silicates, or calcium phosphate a binder which is a normally solid vinyl-type polymer containing carboxyl groups or salts thereof.

In general, the binder is added in amounts of 0.1–10%, preferably 0.5–5% by weight based on the total adsorbent composition.

The polymers can be prepared directly from ethylenically unsaturated monomers containing carboxyl groups, or indirectly from ethylenically unsaturated monomers containing functional carboxylic acid derivatives, such as esters, amides, or anhydrides which can be treated in a second step to liberate the free acid or salts thereof. It is preferred that the final polymer contain 1 to 3, more preferably 1 to 2 carboxyl groups per monomer unit, and corresponding amounts when the acid hydrogen of the carboxyl group is replaced by a cation. The final molecular weight of the polymer is generally between about 8,000 and 3,000,000.

Among the carboxyl-containing monomers that can be employed are monocarboxylic acids such as acrylic acid, alpha-substituted acrylic acids such as methacrylic, ethacrylic, propacrylic, and phenacrylic, as well as other ethylenically unsaturated fatty acids such as 1-butenoic, 9-decylenic acid, and 10-undecylenic acid, and also polycarboxylic acids or anhydrides thereof such as maleic acid anhydride, itaconic acid, aconitic acid and higher homologs of both. Generally speaking, such monomers contain about 3–12 carbon atoms.

Of course, it is unnecessary for all the monomers to be carboxylic acids or derivatives thereof since it is possible to copolymerize the carboxylic acid-containing monomer with one or more non-acidic monomers such as, for example, mono-α-ethylenically unsaturated monomers of 2–10 carbon atoms.

Particularly preferred polymers are carboxy vinyl polymers (carboxypolymethylene), polyacrylic acid, polymethacrylic acid, and ethylene-maleic acid copolymers.

By the use of these polymeric binders with the adsorbents, an outstanding adherence and abrasion-resistance can be achieved. There is no need for glass plates or films coated with such adsorbent compositions to be transported in special containers; they may be deposited one upon the other without resulting in damage to adsorbent layers.

Furthermore, it is both unexpected and highly advantageous to find that the binders of this invention result in layers which can be sprayed with diluted and also with concentrated acids such as $H_2SO_4$, and subsequently heated without affecting identification reactions of the separated substances. In other words, despite the fact that the polymeric binders of this invention are organic in nature, the layers do not discolor after spraying them with acids, and followed by heating. This equally applies to other identification reagents frequently utilized in thin-layer chromatography, as for instance phosphoric acid, perchloric acid, antimony trichloride (in glacial acetic acid), anisaldehyde, sulphuric acid, p-toluenesulphonic acid, phosphomolybdic acid, phosphotungstic acid and vanillin in various acids.

It is further surprising that no shrink cracks are formed in the adsorbent layer when the absorbents of this invention are used in the thicker layers necessary for preparative plate chromatography. Another advantage of the above-mentioned binders is that their salts, in particular the sodium salts, do not dissolve in any organic solvent, and because of their high viscosity cannot be washed out of the layer even by aqueous solutions.

Instead of additives containing free carboxyl groups, salts thereof will generally be used because the binder should have the same pH as the basic adsorbent in order to avoid changes in its adsorption properties. The possibility of any independent ion exchange activity on the part of the free carboxyl groups of these compounds is thereby also eliminated.

Silica gels used in plate chromatography are in general characterized by a neutral or slightly acidic reaction, whereas, some aluminum oxides exhibit alkaline reactions. Basing the pH value of the salts on the pH values of the base adsorbent, there are preferably employed alkali metal salts, such as, for example, sodium, potassium and lithium, and alkaline earth metal salts, such as, for example, barium, strontium, calcium and magnesium salts. For economic reasons, the alkali metal salts, especially sodium salts, are most preferred. Ammonium and amine salts can also be used.

High molecular weight carboxyvinyl polymers are, for example known under the registered trademark Carbopol®. They are available as dry, white, free-flowing powders in form of the free acids. They are dissolved in water and then preferably neutralized with bases to yield the corresponding salts. Their solutions are very viscous in very low concentrations (below 0.1%). By varying the concentrations, a desired degree of viscosity can be achieved.

Polymers prepared from acrylic and methacrylic acids are known under the trademark "Rohagit®." Here again, the solutions of the salts, in particular of the alkali metal salts, are very suitable; they can be used in a wide range of viscosities. Whereas, dilution of the solutions of the alkali metal salts is not followed by a remarkable decrease in viscosity, the viscosity is influenced by the pH of the solution. The free acids are water-insoluble, but do swell at higher temperatures. The alkali metal salts and alkaline earth metal salts, on the contrary, dissolve in water. The former give clear, the latter opaque solutions. Alkaline solutions are characterized by a stable viscosity, whereas the viscosity of neutral or acidic solutions changes slightly upon storage.

Of the copolymers based upon ethylene/maleic acid, the salt solutions, in particular the alkali metal salts, are preferred. They are prepared by copolymerization of ethylene and maleic anhydride, saponification of the anhydride and, if desired, partial neutralization. Products of this kind are offered as EMA®, e.g., known under the trademark. The available products have a wide variety of different molecular weights and range from linear to cross-linked copolymers. Using water or various organic solvents, solutions of different viscosities can be prepared. Preferably, there are used the mono- or-disodium salts of these copolymers and mixtures of these salts, respectively.

According to this invention, any conventional suport plate or film can be employed, such as glass plates, metal-plates or films, plastic films, etc.

The new adsorbents are of particular importance for thin-layer chromatography because whereas in the past the analytical laboratory was in the practice of making the chromatoplates from adsorbent compositions, the tendency today is that laboratories are increasingly requesting adsorbent layers ready for use, i.e., layers which are spread on plates or films, dried and activated.

According to this invention, the adsorbents which are generally suitable to form the basic adsorbent are those which are usually applied in plate chromatography (which includes thin-layer chromatography as well as preparative chromatography). For example, all kinds of silica gels can be used which have medium-sized pores, i.e., a specific surface area between approximately 500 and 600 m.$^2$ per g., an average pore diameter between about 30 and 50 A., a pore volume between approximately 0.6 and 0.9 cm.$^3$ per g. and a particle size distribution of:

| | Wt. percent |
|---|---|
| $>30\mu$ | 2 |
| $6-30\mu$ | 63 |
| $<6\mu$ | 34 |

A suitable kieselguhr to be used as adsorbent is, for example, a kieselguhr that has been washed with HCl and subsequently ignited—about 85% of the resultant product having a particle size between 5 and $30\mu$.

As magnesium silicates, preferred products are those that contain about 15.5% MgO and about 84% $SiO_2$ and have a particle size less than $75\mu$.

In addition, all those aluminum oxides can be used which are usually applied in chromatography, i.e., basic, neutral and acid types with particle size distribution of about:

| | Wt. percent |
|---|---|
| $>26\mu$ | 2 |
| $6-26\mu$ | 69 |
| $<6\mu$ | 29 |

All kinds of commercial calcium phosphates are also useful, in particular those precipitated from solutions. Exceptionally suitable are hydroxylapatites, prepared according to the method described in Arch. Biochem. Biophys. 65, 132 (1965).

Aside from the novel polymeric binders set forth herein, other inorganic binders, such as very finely divided silica, can be additionally incorporated with the adsorbents, if desired. It is expedient to add 2 to 7%, preferably 3 to 5% of this very finely divided silica (3–30 m$\mu$) prepared, for instance, by the thermohydrolysis of silicon tetrachloride. Addition of such silica is most preferred when the basic adsorbents are silica gel, kieselguhr and magnesium silicate. On the other hand, when using aluminum oxide as basic adsorbent very finely divided aluminium hydroxide gels (aluminogels) having a particle size of $<1\mu$, preferably of 0.001 to $0.1\mu$ are especially suited; they are prepared from solutions of aluminum salt solutions by precipitation with bases, filtration, washing and gentle drying.

In order to facilitate the determination of materials which are colorless but absorb UV-light, an inorganic phosphor can be added to the absorbent composition, for example, zinc silicate activated with manganese, magnesium tungstate, cadmiumhalogen phosphate, calcium phosphate activated with tin, calcium silicate activated with manganese alone or manganese together with lead, or calcium halogenophosphate activated with antimony alone or with antimony together with manganese. As for colorless materials absorbing in UV-light (below 220 m$\mu$) an organic fluorescence indicator as, for instance, 3-hydroxypyrene-5,8,10-trisulphonic acid sodium salt, 3,5-dihydroxypyrene-8,10-disulphonic acid sodium salt or morin can be used.

The application of inorganic fluorescence indicators to substances which absorb in the medium UV-range above 230 m$\mu$ leads to decreasing intensity and extinguishing of fluorescence, respectively, when such substances are irradiated with shortwave UV-light (254 m$\mu$). Consequently, by this technique, bands of adsorbed substances show up as dark spots as contrasted to the fluorescent region.

Under the influence of long-wave UV-light (366 m$\mu$) the organic fluorescence indicators produce an additive effect upon the fluorescence of bands of the adsorbed substances, so in this case the adsorbed substances show up as brighter spots in contrast to the fluorescent region.

To prepare the adsorbent compositions of the invention, the binders in the form of aqueous solutions are thoroughly mixed with the basic adsorbents to form aqueous suspensions. Since the binders are in the form of aqueous solutions, they are devoid of emulsifying agents. For this purpose a so-called "intensive mixer" is frequently used. Then the adsorbent compositions are coated on to the substrates, dried and activated, as usual. The following table illustrates the general and preferred ranges of the compositions in percent by weight:

|  | General | Preferred |
| --- | --- | --- |
| Polymeric binder | 0.1–10 | 0.5–5 |
| Base adsorbent | 73–99.9 | 86.5–96.5 |
| Inorganic binder | 1–15 | 2–7 |
| Fluorescent substance | 0.1–2 | 1–1.5 |

Adsorbent layers prepared with the new adsorbent compositions of this invention are abrasion-resistant to the extent that it appears to be impossible to remove them from substrates by even a compressed air blast—which is a remarkable contrast to the adsorbents used up to now. For thin layer chromatography, the layer thickness is in general below 0.5 mm. In preparative layer chromatography, layers having a thickness of up to 10 mm. are used.

In order to evaluate the abrasion resistance of the new adsorbents quantitatively, the following new test was developed: a cylindrical magnetic stirrer (length 3.5 cm. weight 7.3 g.) rotates on a chromatoplate made in the usual manner from a glass plate and an adsorbent composition.

The stirrer has a constant speed of 108 r.p.m. as measured on a glass plate, and the time is measured which is needed to scrape off the layer. The following table shows the abrasion time of some adsorbents which were prepared according to the examples of the invention as compared with the commonly used adsorbents, and clearly brings out the unexpected advantages of the chromatoplates of this invention.

|  | Thickness of layer after activation ($\mu$) | Abrasion-time measured (sec.) | Abrasion-time calculated for a layer having a thickness of 200$\mu$ (sec.) |
| --- | --- | --- | --- |
| Silica gel with gypsum | 200 | 2.1 | 2.1 |
| Silica gel with finely divided silica | 200 | 4.1 | 4.1 |
| Aluminum oxide with aluminum hydroxide gel | 200 | 7.3 | 7.3 |
| Silica gel according to Example 1 | 160 | 12.5 | 15.6 |
| Silica gel according to Example 2 | 95 | 19.6 | 41.3 |
| Silica gel according to Example 3 | 165 | 12.5 | 15.2 |
| Silica gel according to Example 4 | 125 | 48.5 | 77.6 |
| Silica gel according to Example 5 | 65 | 100.0 | 307.7 |

The present invention thus constitutes an important development in the field of plate chromatography on a preparative scale as well as in thin-layer chromatography on an analytic scale.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

1. g. of Carbopol® 934 is shaken for 3 min. with 400 ml. of water until a homogeneous milky suspension is obtained. With periodic shaking, 102 ml. of about 10% sodium hydroxide are added dropwise until the pH of the suspension is adjusted to a pH of 7. To the clear viscous solution are added 100 g. of a silica gel having a particle size of about 30$\mu$. About 400 ml. of water are further added with agitation until a smooth suspension of silica gel is obtained.

Adjusting the slot of the applicator to 750$\mu$, 20–25, glass plates (200 x 200 mm.) are coated. After drying the layers for one day at normal temperature, they are activated by heating to 130° C. Their surface is homogeneous, abrasion-resistant and shows no shrinking cracks. The thickness of the layer is about 160$\mu$.

EXAMPLE 2

In a wide-necked 20-liter flask, 20 g. of Carbopol® 934 are stirred with 8 liters of water for about 15 min. until a homogeneous milky suspension is obtained. Under continuous stirring, about 30 ml. of a 10% caustic soda are added dropwise until the pH of the solution is adjusted to a pH of 7. To the clear viscous solution there are added 990 g. of silica gel having a particle size of about 30$\mu$ and 10 g. of zinc silicate activated with manganese. Then approximately 5.6 liters of water are added to form a smooth suspension. After adjusting the slot of an applicator to the desired thickness, about 400 glass plates (200 x 200 x 1 mm.) or about 80 m. of a suitable plastic film (200 mm. width), are coated. After drying in air or by IR-irradiation, the layers are activated by further drying. The resultant chromatoplates are exceptionally abrasion-resistant, the thickness of the layer being about 100$\mu$.

EXAMPLE 3

20 g. of an approximately 10% solution of Rohagit® SL147 are diluted with 180 ml. of water; there are then added 99 g. of silica gel having a particle size of about 30$\mu$, as well as 1 g. of zinc silicate activated with manganese.

Under agitation, about 320 ml. of water are added to give a smooth suspension.

After adjusting the slot of the applicator to 500$\mu$, about 25–30 glass plates (200 x 200 mm.) are coated. After drying in air for one day, the layers are activated by heating for 1 hr. to 130° C. Their surface is homogeneous, abrasion-resistant and shows no shrinking cracks. The thickness of the layer is 165$\mu$.

EXAMPLE 4

50 g. of a solution (about 10%) of Rohagit® SL147 are diluted with 450 ml. of water. Thereafter, 99 g. of silica gel of a particle size of about 30$\mu$, and 1 g. of zinc silicate activated with manganese are added. Under agitation, about 240 ml. of water are further added to give a smooth suspension.

After adjusting the slot of the applicator to 500$\mu$, approximately 40 glass plates (200 x 200 mm.) are coated. After being predried for several hours in air, the layers are allowed to dry completely by IR-irradiation, and then are activated. The thickness of the layer is 125$\mu$.

EXAMPLE 5

2 g. of Carbopol® 934 are shaken with 800 ml. of water for about 3 min. to give a homogeneously milky suspension. On further periodic shaking, 2–4 ml. of an approximately 10% caustic soda are added dropwise until the pH of the solution is adjusted to a pH of 7.

To the clear viscous solution there are added 99 g. of a basic aluminum oxide of a particle size of approximately 30$\mu$ and 1 g. of zinc silicate activated with manganese. Under activation, roughly 400 ml. of water are added to give a smooth suspension.

After adjusting the slot of the applicator to 750$\mu$, about 30 glass plates (200 x 200 mm.) are coated. After drying the layers for one day in air, they are activated by heating to 140° C. for one hour. The surface of the layers is homogeneous, abrasion-resistant and shows no shrinking cracks. Their thickness is approximately 65$\mu$.

EXAMPLE 6

1.6 g. of Carbopol® 934 is agitated with 640 ml. of water for about 3 min. until a homogeneous milky suspension is obtained. On further periodic agitation, 2–3 ml. of about 10% sodium hydroxide is added in order to adjust the pH to 7. Then to the resultant clear viscous solution there are added 752 g. of silica gel of a particle size of about 30µ, 40 g. of finely divided silica having a particle size of approximately 20 mµ., and 8 g. of zinc silicate activated with manganese. Under agitation, another 1600 ml. of water are added to give a suspension of silica gel which is easy to pour.

5 aluminum plates (100 x 200 x 3 mm.) in plastic frames sealed with foam are treated with about 500 ml. of the suspension; motion of the frames provides equal distribution. After predrying for one day in horizontal position the layers are activated by drying for 2 hrs. to 120° C., the thickness of the layer then being about 2 mm.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What we claim is:

1. An adsorbent composition for layer chromatography, comprising an intimate mixture of, in percent by weight, 0.1 to 10 percent of a water-soluble polymeric binder selected from a group consisting of a normally solid vinyl-type polymer containing carboxyl groups, and a salt thereof, and 73 to 99.9% of a silica gel chromatography adsorbent, said salt being selected from the group consisting of an alkali metal salt, an alkaline earth metal salt, an ammonium salt and an amine salt, and with the provision that said composition is devoid of any emulsifying agent.

2. A composition as defined by claim 1, wherein the polymeric binder is present in a concentration of 0.5 to 5%.

3. An adsorbent composition as defined by claim 1, wherein a polymeric binder is an alkali metal salt of polyacrylic acid or polymethylacrylic acid.

4. An adsorbent composition as defined by claim 1, wherein said polymeric binder is a salt of a carboxyvinyl polymer.

5. An adsorbent composition as defined by claim 1, wherein said polymeric binder is a salt of a copolymer of ethylene and maleic acid.

6. A chromatographic plate comprising a support plate and superimposed thereon a uniform layer of a composition as defined by claim 1.

7. A chromatographic plate comprising a support plate and superimposed thereon a uniform layer of a composition as defined by claim 2.

8. A chromatographic plate comprising a support plate and superimposed thereon a uniform layer of a composition as defined by claim 3.

9. A chromatographic plate comprising a support plate and superimposed thereon a uniform layer of a composition as defined by claim 4.

10. A chromatographic plate comprising a support plate and superimposed thereon a uniform layer of a composition as defined by claim 5.

11. An adsorbent composition for layer chromatography, comprising an intimate mixture of, in percent by weight, 0.1 to 10 percent of a water-soluble polymeric binder selected from the group consisting of alkali metal polyacrylate and polymethacrylate, and 73 to 99.9% of a chromatography adsorbent selected from the group consisting of silica gel, kieselguhr, aluminum oxide, magnesium silicates, and calcium phosphate.

12. A composition as defined by claim 11, wherein the polymeric binder is present in a concentration of 0.5 to 5%.

13. A composition as defined by claim 11, wherein the alkali metal is sodium.

14. A chromatographic plate comprising a support plate and superimposed thereon a uniform layer of a composition as defined by claim 11.

15. A chromatographic plate comprising a support plate and superimposed thereon a uniform layer of a composition as defined by claim 12.

16. An adsorbent composition for layer chromatography, consisting essentially of an intimate mixture of, in percent by weight, 0.1 to 10 percent of a water-soluble polymeric binder selected from a group consisting of a normally solid vinyl-type polymer containing carboxyl groups, and a salt thereof, and 73 to 99.9% of a chromatography adsorbent selected from the group consisting of silica gel, kieselguhr, aluminum oxide, magnesium silicates, and calcium phosphate, said salt thereof being selected from the group consisting of an alkali metal salt, an alkaline earth metal salt, an ammonium salt and an amine salt, and with the provision that said composition is devoid of any emulsifying agent.

17. A chromatographic plate comprising a support plate and superimposed thereon a uniform layer of a composition as defined by claim 16.

18. An absorbent composition for layer chromatography, comprising an intimate mixture of, in percent by weight, 0.1 to 10 percent of a water-soluble polymeric binder selected from a group consisting of a normally solid vinyl-type polymer containing carboxyl groups, and a salt thereof, 73 to 99.9% of a chromatography adsorbent selected from the group consisting of silica gel, kieselguhr, aluminum oxide, magnesium silicates, and calcium phosphate, 1–15% of an inorganic binder selected from the group consisting of silica of a particle size of 3–30 mµ and aluminogel of a particle size of less than 1µ; and 0.1–2% of fluorescence indicator, said salt thereof being selected from the group consisting of an alkali metal salt, an alkaline earth metal salt, an ammonium salt and an amine salt, and with the provision that said composition is devoid of any emulsifying agent.

19. An adsorbent composition as defined by claim 18 wherein there is 0.5–5% of said polymeric binder, 86.5–96.5% of said chromatography adsorbent, 2–7% of said inorganic binder, and 1–1.5% of said fluorescence indicator.

20. A composition as defined by claim 19 wherein said chromatography adsorbent is silica gel and said inorganic binder is said silica of a particle size of 3–30 mµ.

21. A chromatographic plate comprising a support plate and superimposed thereon a uniform layer of a composition as defined by claim 18.

22. A chromatographic plate comprising a support plate and superimposed thereon a uniform layer of a composition as defined by claim 19.

23. A chromatographic plate comprising a support plate and superimposed thereon a uniform layer of a composition as defined by claim 20.

24. A chromatographic plate comprising a support plate having superimposed thereon an intimate mixture of, in percent by weight, 0.1 to 10 percent of a water-soluble polymeric binder selected from a group consisting of a normally solid vinyl-type polymer containing carboxyl groups, and a salt thereof, and 73 to 99.9% of a chromatography adsorbent selected from the group consisting of silica gel, kieselguhr, aluminum oxide, magnesium silicates, and calcium phosphate, said salt thereof being selected from the group consisting of an alkali metal salt, an alkaline earth metal salt, an ammonium salt and an amine salt, and with the provision that said composition is devoid of any emulsifying agent.

25. A chromatograph as defined by claim 24, wherein the polymeric binder is present in a concentration of 0.5 to 5%.

26. A chromatograph as defined by claim 24, wherein a polymeric binder is a salt of polyacrylic acid or polymethylacrylic acid.

27. A chromatograph as defined by claim 24, wherein said polymeric binder is a salt of a carboxyvinyl polymer.

28. A chromatograph as defined by claim 24, wherein said polymeric binder is a salt of a copolymer of ethylene and maleic acid.

References Cited

UNITED STATES PATENTS

| Re.25,400 | 6/1963 | Doyling | 252—428 |
|---|---|---|---|
| 3,298,925 | 1/1967 | Mosbach | 195—66 |
| 2,929,792 | 3/1960 | Arnold | 252—430 |
| 2,524,414 | 10/1950 | Wolfrom. | |
| 3,065,185 | 11/1962 | Burns | 252—428 |
| 2,933,455 | 4/1960 | Doyling | 252—428 |
| 3,091,550 | 5/1963 | Doyling. | |

OTHER REFERENCES

"Thin Layer Chromatography," Bobbitt, Reinhold Pub. Corp. (1963).

PATRICK P. GARVIN, Primary Examiner

P. M. FRENCH, Assistant Examiner

U.S. Cl. X.R.

252—430, 431